(12) United States Patent
Hsu et al.

(10) Patent No.: US 11,883,920 B2
(45) Date of Patent: Jan. 30, 2024

(54) PROGNOSTIC AND HEALTH MANAGEMENT SYSTEM FOR PRECISION BALL GRINDING MACHINES

(71) Applicant: TAN KONG PRECISION TECH CO., LTD., Taichung (TW)

(72) Inventors: Ya-Chen Hsu, Taichung (TW); Yu-Ming Huang, Chiayi (TW); Yei-Gei Chen, Changhua County (TW); Kuan-Ting Kuo, Changhua County (TW); Shiang-Chi Chen, Taichung (TW); Po-Hsiu Ko, Taichung (TW)

(73) Assignee: Tan Kong Precision Tech Co., Ltd., Taichung (TW)

( * ) Notice: Subject to any disclaimer, the term of this patent is extended or adjusted under 35 U.S.C. 154(b) by 417 days.

(21) Appl. No.: 17/304,001

(22) Filed: Jun. 11, 2021

(65) Prior Publication Data

US 2022/0395954 A1 Dec. 15, 2022

(51) Int. Cl.
*B24B 11/04* (2006.01)
*B24B 49/18* (2006.01)
*G05B 19/4065* (2006.01)

(52) U.S. Cl.
CPC .............. *B24B 11/04* (2013.01); *B24B 49/18* (2013.01); *G05B 19/4065* (2013.01); *G05B 2219/32201* (2013.01)

(58) Field of Classification Search
CPC ..... B24B 11/04; B24B 49/18; G05B 19/4065; G05B 2219/32201; G05B 2219/2627
See application file for complete search history.

(56) References Cited

FOREIGN PATENT DOCUMENTS

| CN | 111941229 A | * | 11/2020 | ......... B24B 27/0076 |
| JP | 2006116623 A | * | 5/2006 | |

OTHER PUBLICATIONS

English Translation of CN-111941229-A (Year: 2020).*
English Translation of JP-2006116623-A (Year: 2006).*

* cited by examiner

*Primary Examiner* — Charles R Kasenge
(74) *Attorney, Agent, or Firm* — Wang Law Firm, Inc.

(57) ABSTRACT

A prognostic and health management system for precision ball grinding machines includes: a detector connected to a first and a second grinding discs; and a central processing module including a determining unit, a historical data recording unit, a timing unit, and an alarm unit. The detector is connected to the determining unit, detects data of the two grinding discs, and sends the data to the determining unit, the determining unit compares data in the historical data recording unit to determine whether the first and second grinding discs are abnormal, if there is an abnormality, the alarm unit releases a warning signal, if the determining unit determines that there is no abnormality, the timing unit records a grinding time of the first and second grinding discs, and based on a comparison of the past records, the alarm unit releases a warning signal after a predetermined time has elapsed.

5 Claims, 9 Drawing Sheets

PROGNOSTIC AND HEALTH MANAGEMENT SYSTEM FOR PRECISION BALL GRINDING MACHINES

BACKGROUND

Field of the Invention

The present invention relates to the technical field of precision ball grinding machines, and more particularly to a prognostic and health management system for precision ball grinding machines.

Description of Related Art

The production process of steel balls mainly includes: wire coil, drawing, heading, flashing, heat treatment, grinding, lapping, super finish, clean, quality control, packaging, etc. Of course, the production process might slightly be different according to the needs of each company, but the process of producing steel balls will not deviate from the aforementioned general direction.

Since steel balls are often used in precision machinery, which requires a high degree of precision, no matter how the steel balls are processed, the steel balls used in precision machinery will eventually be subjected to a process of grinding and a process of lapping.

Grinding discs are like common tools used in precision machinery, and a broken grinding disc is like a damaged tool, which will scratch the surface of the steel balls; when personnel discover the grinding disc is broken, many cycles have passed, and there are many scratches on the surface of the steel balls. The broken grinding disc causes the steel balls to move in the disc not smoothly, and indirectly causes the roundness and size of the steel balls to be out of tolerance, so it needs to be dealt with before the broken grinding disc occurs. In each stage of steel ball grinding, the grinding disc is often damaged by improper squeezing of the grinding disc due to foreign matter falling or artificial abnormal operation. At present, the main way to eliminate damage to the grinding disc is to detect damaged steel balls through the quality inspection stage, and then check the damage of the grinding disc. However, this detection method is not only ineffective, it is prone to produce a large number of defective steel balls, but also causes excessive cost loss of defective products. In view of this, it is indeed necessary to provide a technical means to solve the problem that the existing precision ball grinding machines cannot accurately prognose the wear condition of its grinding disc.

SUMMARY

One objective of the present invention is to solve the problem that it is difficult to prognose the health loss of the precision ball grinding machines, which results in the problem that the excessive loss of the grinder can only be defected in occurrence of defect finished products.

A prognostic and health management system for precision ball grinding machines in accordance with the present invention is suitable for application to a first grinding disc and a second grinding disc of the precision ball grinding machines, and comprises:
  a detector connected to the first grinding disc and the second grinding disc;
  a central processing module including a determining unit, a historical data recording unit, a timing unit, and an alarm unit, the detector being signally connected to the determining unit, the detector detecting data of the first grinding disc and the second grinding disc from beginning to damage and sending the data to the determining unit, the determining unit comparing past records stored in the historical data recording unit to determine whether the first grinding disc and the second grinding disc are abnormal, if there is an abnormality, the determining unit drives the alarm unit to release a warning signal, if after the determining unit compares the past records stored in the historical data recording unit, determines that there is no abnormality, the timing unit records a grinding time of the first grinding disc and the second grinding disc, and based on a comparison of the past records stored in the historical data recording unit, the determining unit drives the alarm unit to release a warning signal after a predetermined time has elapsed.

In a preferred embodiment, there are two said detectors, one of the detectors is connected to the first grinding disc, and another detector is connected to the second grinding disc.

In a preferred embodiment, there is one said detector, and the detector chooses to be connected to the first grinding disc or the second grinding disc.

In a preferred embodiment, the first grinding disc is a grinding wheel disc, and the second grinding disc is an alloy disc.

In a preferred embodiment, the first grinding disc and the second grinding disc respectively have a plurality of grinding grooves, a frequency of each of the grinding grooves detected by the detector is different, and the determining unit distinguishes the grinding grooves corresponding to different frequencies.

The present invention monitors the first grinding disc and the second grinding disc in real time through the determining unit, and compares the monitoring results with the information in the historical data one by one, so that it can be known in real time whether the first grinding disc or the second grinding disc is worn or not. In addition, the present invention records the normal operation time of the first grinding disc and the second grinding disc under normal wear and tear through historical data, so that the alarm unit can give an early warning before damage; and the detection result of the detector will be continuously stored in the historical data recording unit, so that the information in the historical data recording unit will be updated all the time, and the prognostic result will become more accurate as the time of use increases. Finally, the determining unit can determine the location of the damaged grinding groove according to the different frequency, and then stop using the corresponding grinding groove. Even if the first grinding disc or the second grinding disc is damaged, the user does not disassemble it for inspection from time to time, and can directly stop the corresponding damaged grinding groove, thereby improving the grinding efficiency.

In another embodiment, the determining unit can not only judge whether the first grinding disc or the second grinding disc is damaged according to the drift status of the frequency spectrum, thereby reducing the use of the detector, which not only reduces the data generation, speeds up the calculation speed of the central processing module, but also reduces the misjudgment caused by the mutual interference of data and makes the determination more accurate.

DETAILED DESCRIPTION

Figure 1:
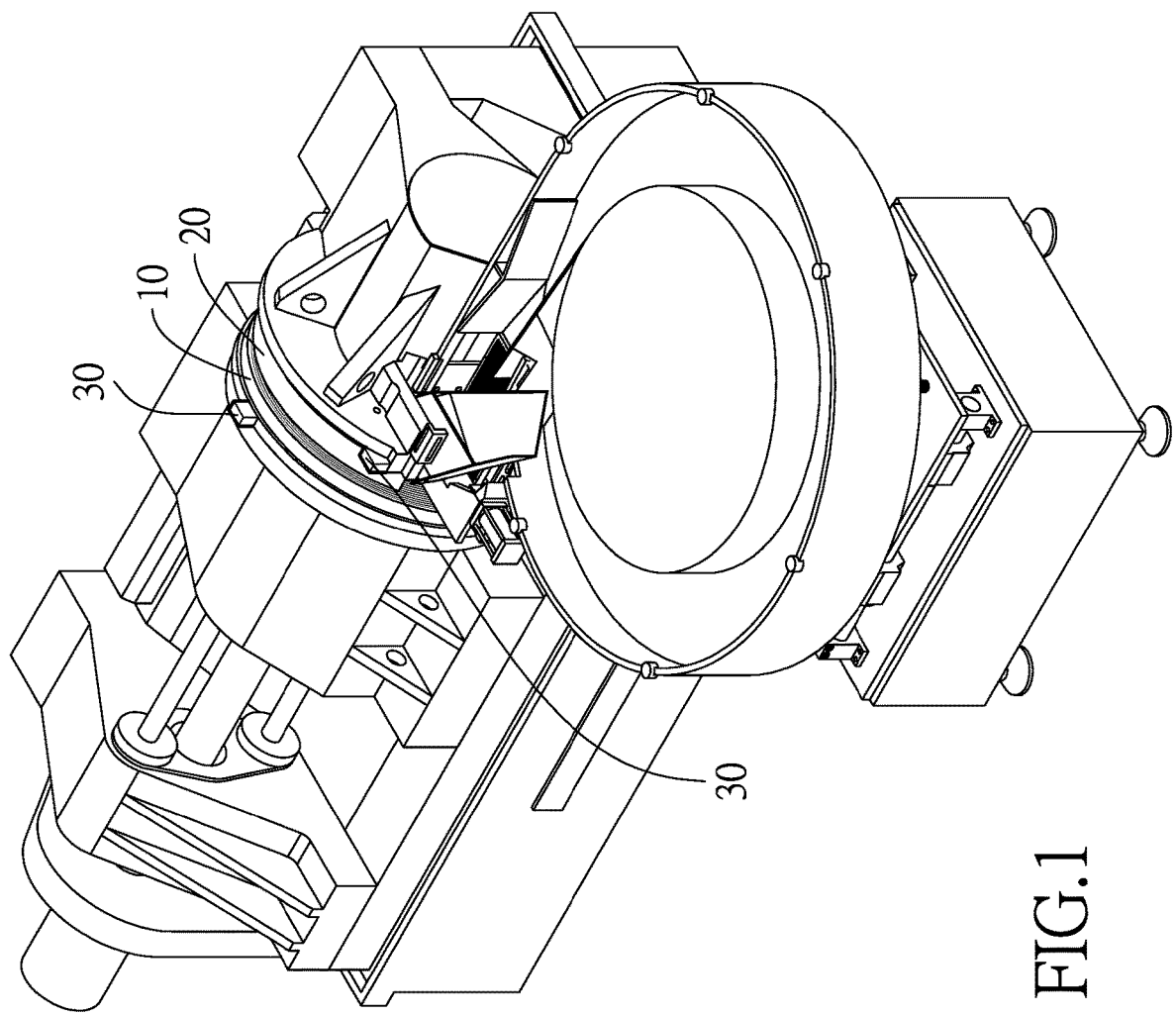
FIG. 1 is a perspective view of the present invention in a preferred embodiment.
Figure 2:
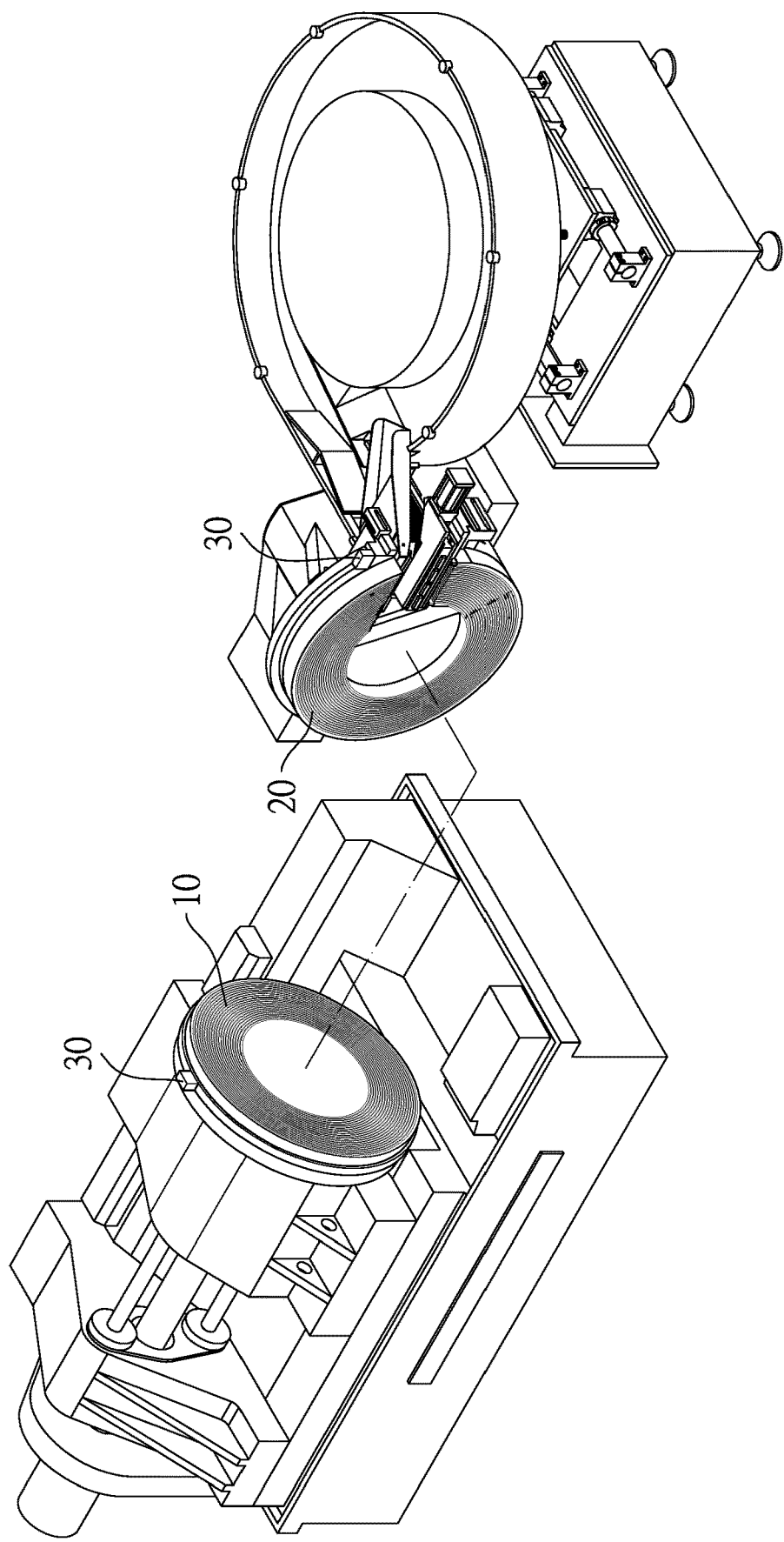
FIG. 2 is an exploded view of the present invention in a preferred embodiment.
Figure 3:
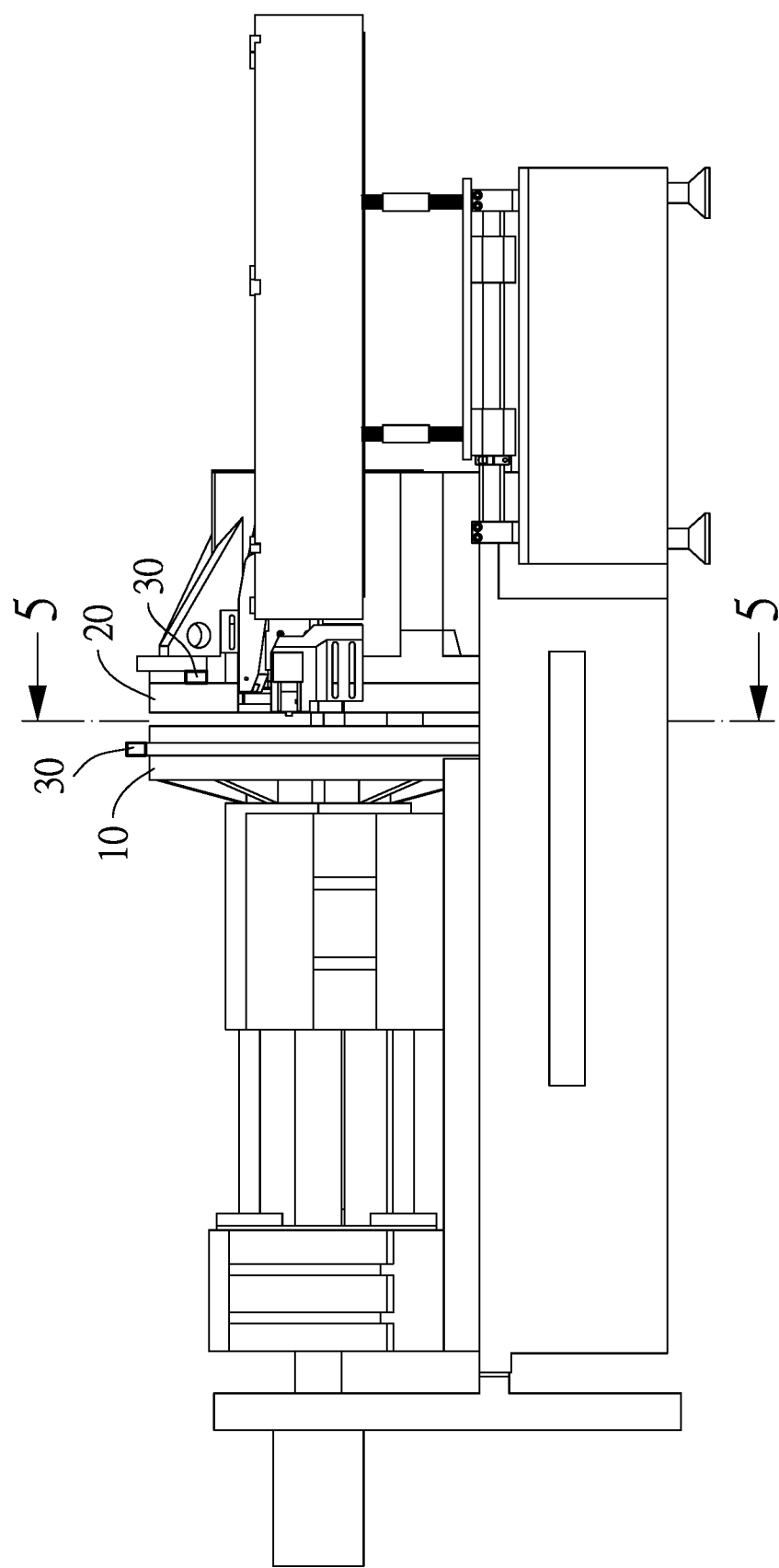
FIG. 3 is a side view of the present invention in a preferred embodiment.
Figure 4:
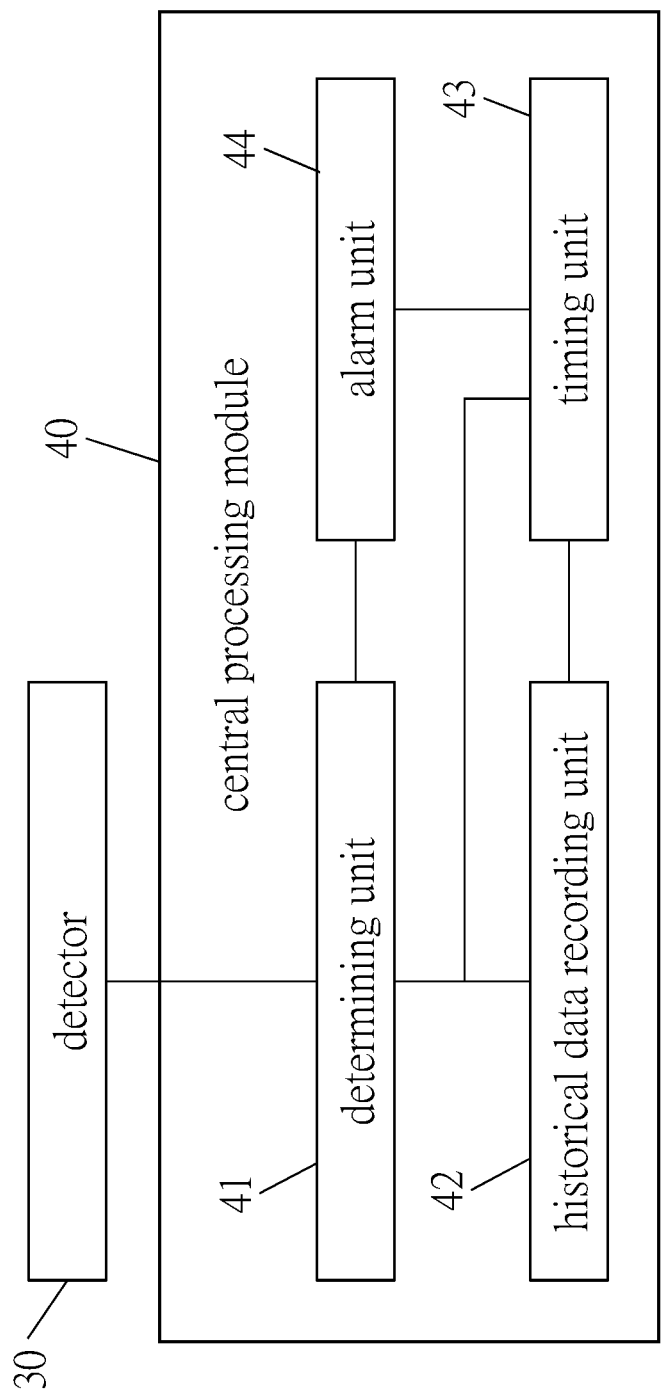
FIG. 4 is a schematic diagram of the structural connection of the present invention in a preferred embodiment.
Figure 5:
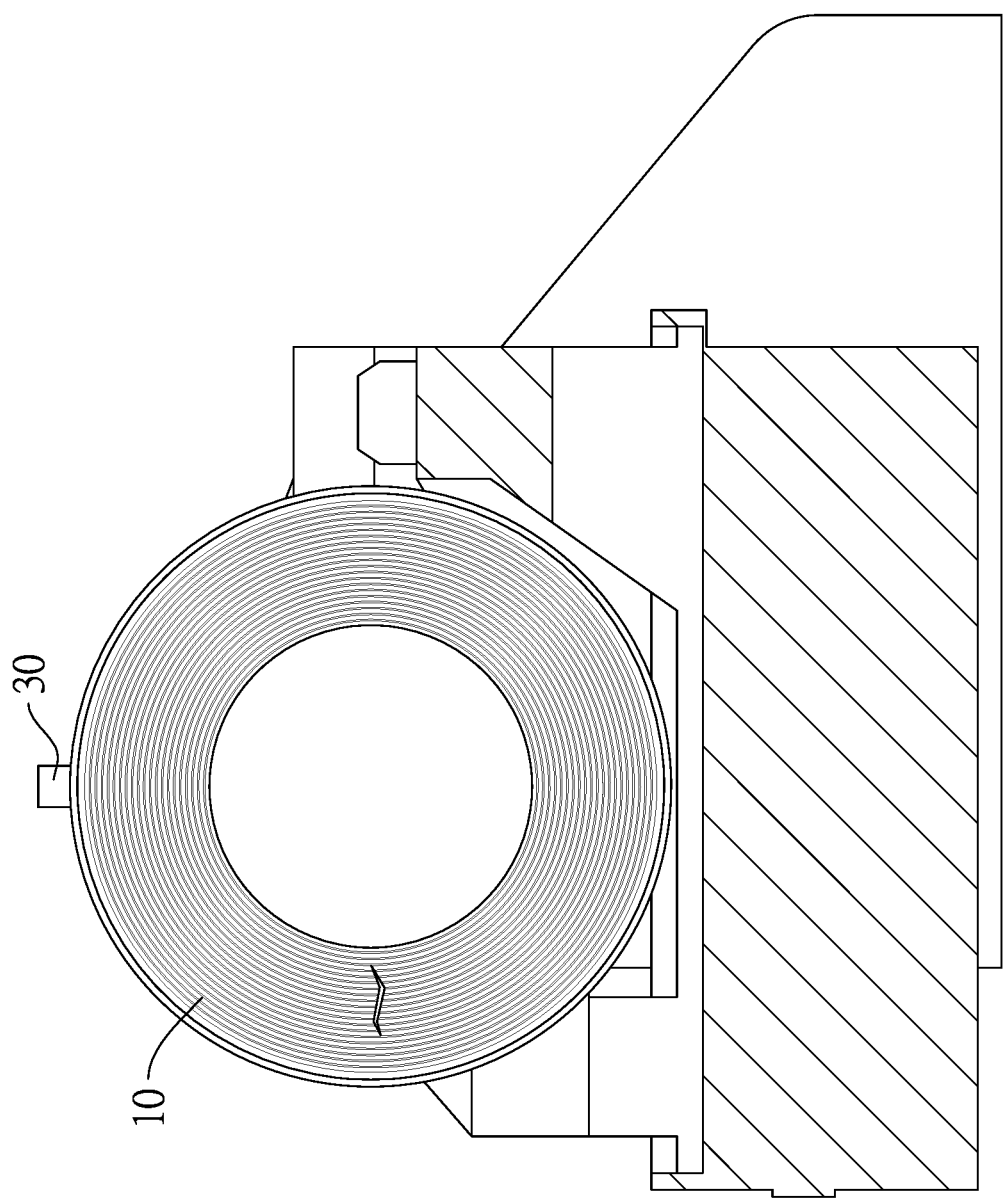
FIG. 5 is a cross-sectional view based on the section line 5-5 in FIG. 3.

Please refer to FIGS. 1 to 4, this invention is a prognostic and health management system for precision ball grinding machines, which is suitable for application to a first grinding disc 10 and a second grinding disc 20 of precision ball grinding machines. The prognostic and health management system essentially comprises a detector 30 and a central processing module 40.

The detector 30 is connected to the first grinding disc 10 and the second grinding disc 20; in this embodiment, there are two detectors 30, and the two detectors 30 can be accelerometers, laser displacement meters, vibration detectors, acoustic emission sensors, etc. In this embodiment, the detectors 30 mainly use accelerometers. One of the detectors 30 is connected to the first grinding disc 10, the other of the detectors 30 is connected to the second grinding disc 20. The method of connecting the two detectors 30 to the first grinding disc 10 and the second grinding disc 20 belongs to the conventional technology, so it will not be repeated here.

The central processing module 40 includes a determining unit 41, a historical data recording unit 42, a timing unit 43, and an alarm unit 44. The detector 30 is signally connected to the determining unit 41. The detector 30 detects the data of the first grinding disc 10 and the second grinding disc 20 from the beginning to the damage and sends to the determining unit 41, and the determining unit 41 compares the past records stored in the historical data recording unit 42 to determine whether the first grinding disc 10 and the second grinding disc 20 are abnormal. If there is an abnormality, the determining unit 41 drives the alarm unit 44 to release a warning signal. If after the determining unit 41 compares the past records stored in the historical data recording unit 42, and determines that there is no abnormality, the timing unit 43 records the grinding time of the first grinding disc 10 and the second grinding disc 20. Based on the comparison of the past records stored in the historical data recording unit 42, the determining unit 41 drives the alarm unit 44 to release a warning signal after a predetermined time has elapsed; in this embodiment, the determining unit 41 of the central processing module 40 is a central processing unit (CPU) the determining unit 41 can analyze the data in the historical data recording unit 42, and the historical data unit stores multiple pieces of historical data of the first grinding disc 10 and the second grinding disc 20 that have been used to determine whether there is an abnormality by the determining unit 41. Through cross-comparison of multiple pieces of data stored in the historical data recording unit 42, the data type of the abnormal data of the first grinding disc 10 is obtained from the multiple pieces of historical data of the first grinding disc 10, and the data type of the abnormal data of the second grinding disc 20 is also obtained from the multiple pieces of historical data of the second grinding disc 20. In this way, the determining unit 41 can determine whether the first grinding disc 10 and the second grinding disc 20 are abnormal in real time based on the data type.

Figure 6:
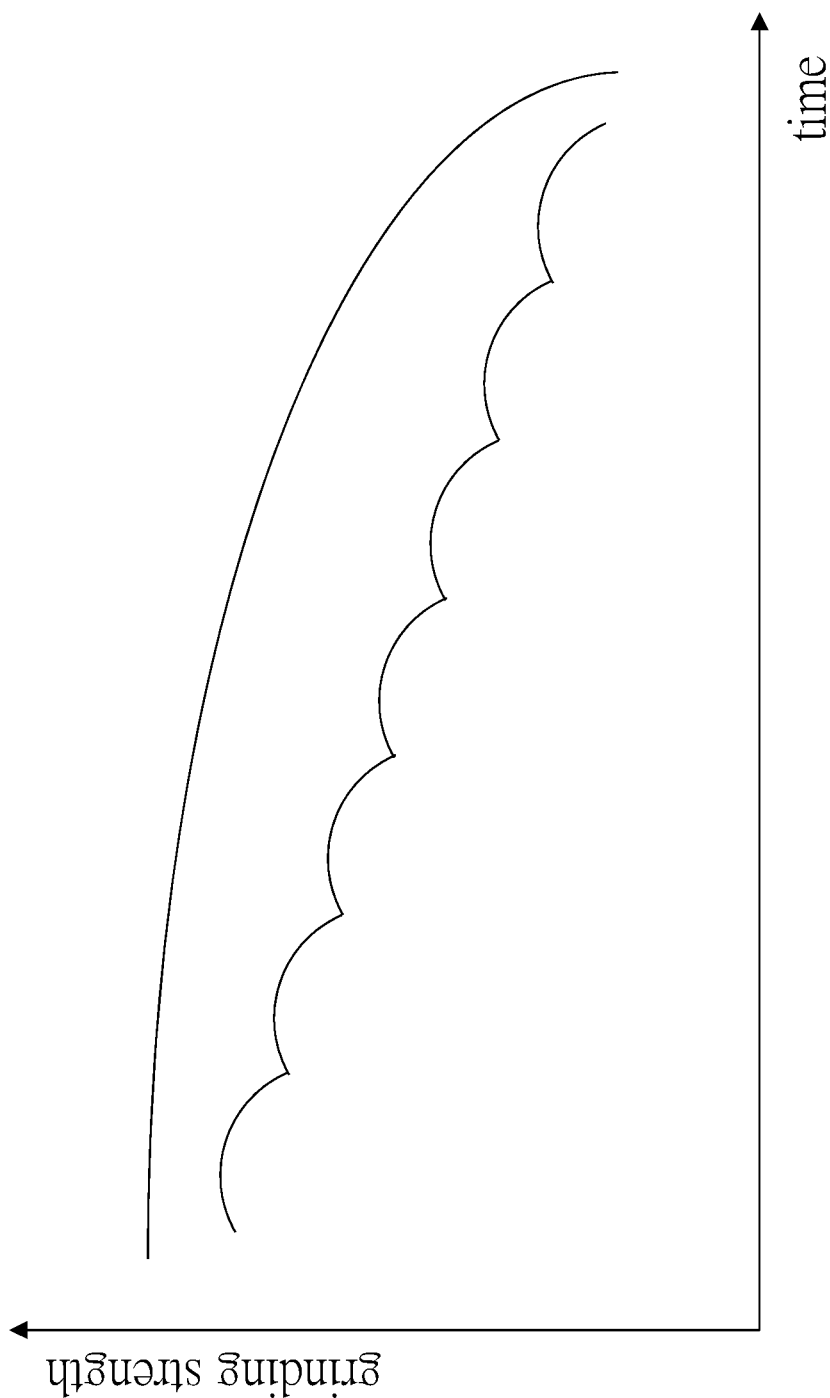
FIG. 6 is a schematic diagram of the grinding strength of the first grinding disc and the second grinding disc in a preferred embodiment of the present invention.

In this embodiment, the first grinding disc 10 is a grinding wheel disc, and the second grinding disc 20 is an alloy disc. Since the first grinding disc 10 and the second grinding disc 20 are made of different materials, the data of the first grinding disc 10 and the second grinding disc 20 collected by the determining unit 41 are not the same. For example, please refer to FIG. 6, the first grinding disc 10 of the grinding wheel has a self-sharpening effect, the grinding intensity will show multiple attenuation intervals and show that the grinding intensity is gradually decreasing. However, the second grinding disc 20, which is an alloy disc, has a slower wear and does not have a self-sharpening function, so its grinding intensity shows a linear decrease. Therefore, most of the data of the first grinding disc 10 received by the determining unit 41 in this embodiment will form a pattern with a plurality of attenuation intervals as shown in FIG. 6, and the basic pattern is used as a reference to determine whether the first grinding disc 10 that is being ground is abnormal; similarly, most of the data of the first grinding disc 10 received by the determining unit 41 in this embodiment will form a linear drop pattern as shown in FIG. 6, and the basic pattern is used as a reference to determine whether the second grinding disc 20 that is being grinded is abnormal. In this way, it can be known whether the first grinding disc 10 or the second grinding disc 20 is abnormal during grinding.

Figure 7A:
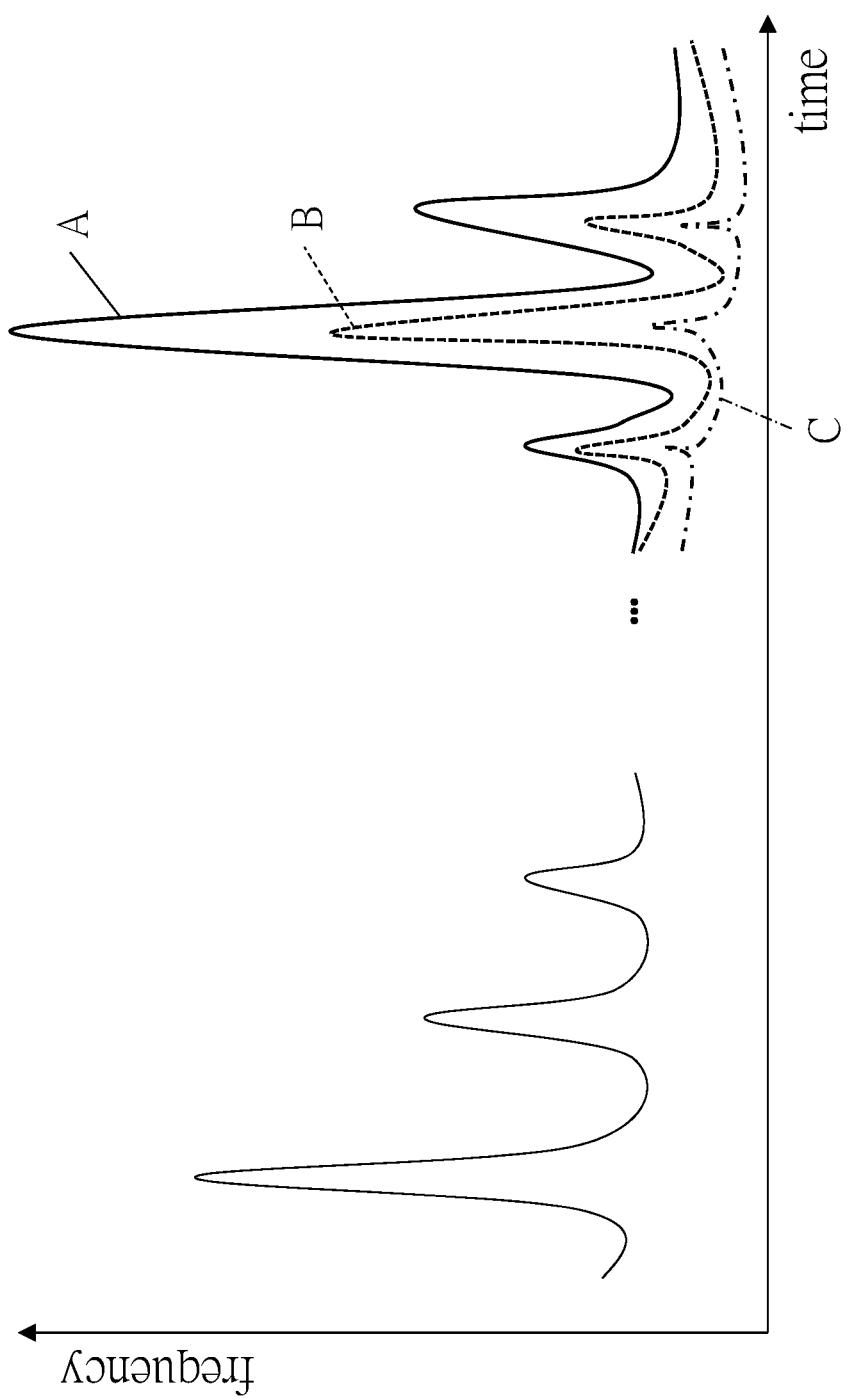
FIG. 7A is a schematic diagram of the frequency when the first grinding disc is damaged in a preferred embodiment of the present invention.
Figure 7B:
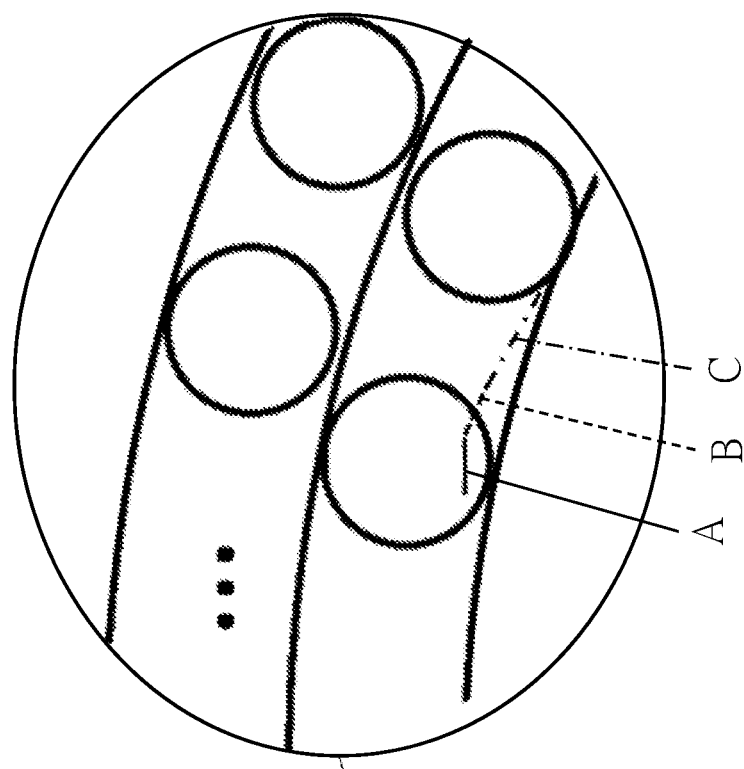
FIG. 7B is a schematic diagram showing the frequency of FIG. 7A corresponding to different positions of the steel balls.
Figure 7B:
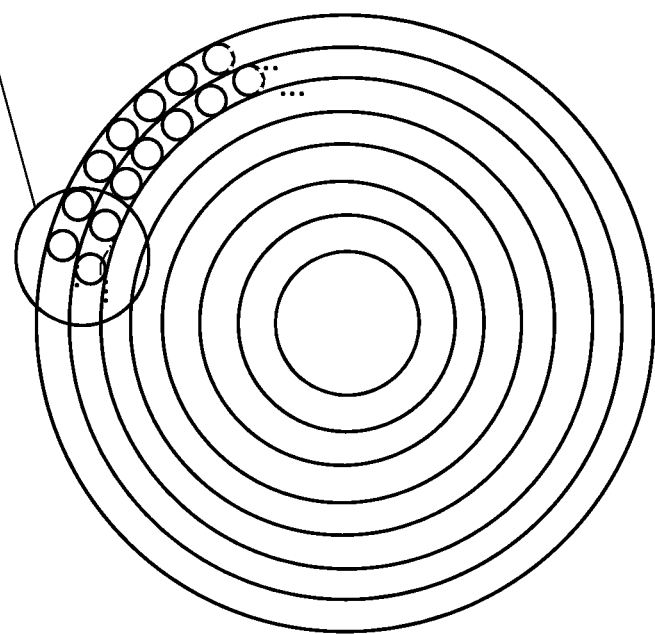

In another embodiment, there is one detector 30, and the detector 30 chooses to be connected to the first grinding disc 10 or the second grinding disc 20. Since steel balls are clamped between the first grinding disc 10 and the second grinding disc 20, the signal from the detector 30 received by the determining unit 41 is a spectrum generated by the coupling of the first grinding disc 10 and the second grinding disc 20. Please refer to FIG. 7A, in this embodiment, the first grinding disc 10 is a rotating disc which is rotating, and the second grinding disc 20 is a fixed disc that does not rotate. Therefore, when the damage occurs on the first grinding disc 10, the damaged part will rotate with the rotation of the first grinding disc 10, and when the steel ball is ground between the first grinding disc 10 and the second grinding disc 20, the initial conditions of the steel ball entering between the first grinding disc 10 and the second grinding disc 20 are different, the steel ball will not be maintained at the same corresponding position as the first grinding disc 10, so the frequency measured by the detector 30 will be unstable. FIG. 7A shows three different frequency states. For the reasons, please refer to FIG. 7B, when the damaged position of the first grinding disc 10 completely overlaps with the steel ball, the damage spectrum is stronger. Therefore, the frequency spectrum of the damaged line segment A shown in FIG. 7A is stronger. When the damaged position of the first grinding disc 10 is between a position where there is a steel ball and a position where there is no steel ball, the resulting damage spectrum is weaker than the spectrum of the damaged line segment A, such as the spectrum of the damage line segment B as shown in FIG. 7A. Finally, when the position of the damaged part of the first grinding disc 10 corresponds to the position where there is no steel ball, the damage spectrum generated is the weakest, such as the spectrum of the damaged line segment C as shown in FIG. 7A. When the spectrum of the damaged line segment shown in FIG. 7A is generated, the determining unit 41 can determine that the damaged position is on the first grinding disc 10.

Figure 8:
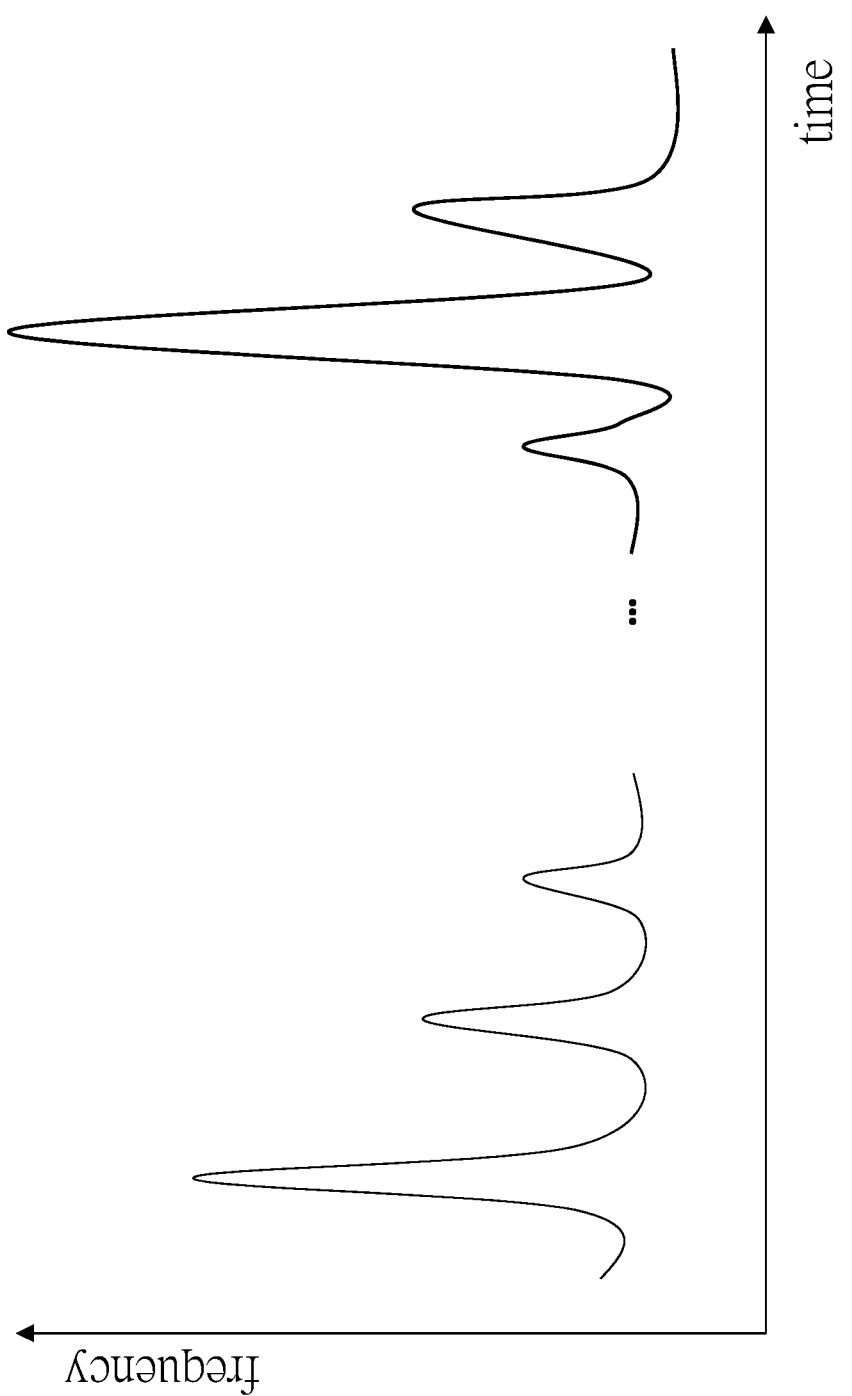
FIG. 8 is a schematic diagram of the frequency when the second grinding disc is damaged in a preferred embodiment of the present invention.

When the damaged position is on the second grinding disc 20, since the second grinding disc 20 does not rotate during the grinding process, the steel ball will periodically pass through the damaged position and produce a stable damaged spectrum as shown in FIG. 8.

Finally, the determining unit 41 can further obtain the condition of the first grinding disc 10 or the second grinding disc 20 according to the difference in frequency. Please refer to the following table 1:

quency, and then stop using the corresponding grinding groove. Even if the first grinding disc 10 or the second grinding disc 20 is damaged, the user does not disassemble it for inspection from time to time, and can directly stop the corresponding damaged grinding groove, thereby improving the grinding efficiency.

In another embodiment, the determining unit 41 can not only judge whether the first grinding disc 10 or the second grinding disc 20 is damaged according to the drift status of the frequency spectrum, thereby reducing the use of the detector 30, which not only reduces the data generation, speeds up the calculation speed of the central processing module 40, but also reduces the misjudgment caused by the mutual interference of data and makes the determination more accurate.

| Grinding groove | Circumference of the grinding groove | Number of steel balls accommodated | Rotation speed 1 time frequency | Rotation speed 2 times frequency | Rotation speed 10 times frequency |
| --- | --- | --- | --- | --- | --- |
| 1 | 1224.6 | 257.1339 | 257.1339 | 514.2677 | 1285.669 |
| 2 | 1202.934 | 252.5846 | 252.5846 | 505.1691 | 1262.923 |
| 3 | 1181.268 | 248.0353 | 248.0353 | 496.0706 | 1240.176 |
| 4 | 1159.602 | 243.486 | 243.486 | 486.972 | 1217.43 |
| 5 | 1137.936 | 238.9367 | 238.9367 | 477.8734 | 1194.683 |
| 6 | 1116.27 | 234.3874 | 234.3874 | 468.7748 | 1171.937 |
| 7 | 1094.604 | 229.8381 | 229.8381 | 459.6762 | 1149.191 |
| 8 | 1072.938 | 225.2888 | 225.2888 | 450.5776 | 1126.444 |
| 9 | 1051.272 | 220.7395 | 220.7395 | 441.4791 | 1103.698 |
| 10 | 1029.606 | 216.1902 | 216.1902 | 432.3805 | 1080.951 |
| 11 | 1007.94 | 211.6409 | 211.6409 | 423.2819 | 1058.205 |
| 12 | 986.274 | 207.0917 | 207.0917 | 414.1833 | 1035.458 |
| 13 | 964.608 | 202.5424 | 202.5424 | 405.0847 | 1012.712 |
| 14 | 942.942 | 197.9931 | 197.9931 | 395.9861 | 989.9654 |
| 15 | 921.276 | 193.4438 | 193.4438 | 386.8876 | 967.2189 |
| 16 | 899.61 | 188.8945 | 188.8945 | 377.789 | 944.4724 |
| 17 | 877.944 | 184.3452 | 184.3452 | 368.6904 | 921.726 |
| 18 | 856.278 | 179.7959 | 179.7959 | 359.5918 | 898.9795 |
| 19 | 834.612 | 175.2466 | 175.2466 | 350.4932 | 876.2331 |
| 20 | 812.946 | 170.6973 | 170.6973 | 341.3946 | 853.4866 |
| 21 | 791.28 | 166.148 | 166.148 | 332.2961 | 830.7402 |
| 22 | 769.614 | 161.5987 | 161.5987 | 323.1975 | 807.9937 |
| 23 | 747.948 | 157.0494 | 157.0494 | 314.0989 | 785.2472 |
| 24 | 726.282 | 152.5002 | 152.5002 | 305.0003 | 762.5008 |
| 25 | 704.616 | 147.9509 | 147.9509 | 295.9017 | 739.7543 |

According to the frequencies disclosed in Table 1, it can be understood that different grinding grooves of the first grinding disc 10 or the second grinding disc 20 produce different frequencies, so the damaged grinding grooves can be known according to the frequencies of different grinding grooves.

The present invention monitors the first grinding disc 10 and the second grinding disc 20 in real time through the determining unit 41, and compares the monitoring results with the information in the historical data one by one, so that it can be known in real time whether the first grinding disc 10 or the second grinding disc 20 is worn or not. In addition, the present invention records the normal operation time of the first grinding disc 10 and the second grinding disc 20 under normal wear and tear through historical data, so that the alarm unit 44 can give an early warning before damage; and the detection result of the detector 30 will be continuously stored in the historical data recording unit, so that the information in the historical data recording unit will be updated all the time, and the prognostic result will become more accurate as the time of use increases. Finally, the determining unit 41 can determine the location of the damaged grinding groove according to the different fre-

What is claimed is:

1. A prognostic and health management system for precision ball grinding machines, suitable for application to a first grinding disc and a second grinding disc of the precision ball grinding machines, the prognostic and health management system comprising:

a detector connected to the first grinding disc and the second grinding disc;

a central processing module including a determining unit, a historical data recording unit, a timing unit, and an alarm unit, the detector being signally connected to the determining unit, the detector detecting data of the first grinding disc and the second grinding disc from beginning to damage and sending the data to the determining unit, the determining unit comparing past records stored in the historical data recording unit to determine whether the first grinding disc and the second grinding disc are abnormal, if there is an abnormality, the determining unit drives the alarm unit to release a warning signal, if after the determining unit compares the past records stored in the historical data recording unit, determines that there is no abnormality, the timing unit records a grinding time of the first grinding disc and the second grinding disc, and based on a comparison of the past records stored in the historical data recording unit, the determining unit drives the alarm unit to release a warning signal after a predetermined time has elapsed.

2. The prognostic and health management system for the precision ball grinding machines as claimed in claim 1, wherein there are two said detectors, one of the detectors is connected to the first grinding disc, another of the detectors is connected to the second grinding disc.

3. The prognostic and health management system for the precision ball grinding machines as claimed in claim 1, wherein there is one said detector, and the detector chooses to be connected to the first grinding disc or the second grinding disc.

4. The prognostic and health management system for the precision ball grinding machines as claimed in claim 1, wherein the first grinding disc is a grinding wheel disc, and the second grinding disc is an alloy disc.

5. The prognostic and health management system for the precision ball grinding machines as claimed in claim 1, wherein the first grinding disc and the second grinding disc respectively have a plurality of grinding grooves, a frequency of each of the grinding grooves detected by the detector is different, and the determining unit distinguishes the grinding grooves corresponding to different frequencies.

* * * * *